United States Patent [19]

Melocik et al.

[11] Patent Number: 4,529,919
[45] Date of Patent: Jul. 16, 1985

[54] PLUGGING AND PLUGGING OVERRIDE CONTROL APPARATUS

[75] Inventors: Grant C. Melocik, Chardon; William Pickering, University Heights, both of Ohio

[73] Assignee: Towmotor Corporation, Mentor, Ohio

[21] Appl. No.: 455,722

[22] Filed: Jan. 5, 1983

[51] Int. Cl.³ .............................................. H02P 3/10
[52] U.S. Cl. .................................. 318/373; 318/375; 318/376; 318/379
[58] Field of Search ............... 318/373, 374, 258, 383, 318/379, 375, 376, 329

[56] References Cited

U.S. PATENT DOCUMENTS

| | | | |
|---|---|---|---|
| 3,551,773 | 12/1970 | Dannettell et al. | 318/341 |
| 3,828,235 | 8/1974 | Price et al. | 318/373 |
| 3,843,912 | 10/1974 | Anderson | 318/258 |
| 3,958,163 | 5/1976 | Clark | 318/373 |
| 3,968,414 | 7/1976 | Konrad | 318/341 |
| 4,068,153 | 1/1978 | Artrip et al. | 318/373 |
| 4,090,116 | 5/1978 | Lippitt | 318/329 X |
| 4,095,153 | 6/1978 | Matty et al. | 318/373 X |
| 4,199,711 | 4/1980 | Horiuchi et al. | 318/373 X |

FOREIGN PATENT DOCUMENTS

1551782 8/1979 United Kingdom .

OTHER PUBLICATIONS

David L. Cohn et al., "A Step by Step Introduction to 8080 Microprocessor System", Dilithium Press, P.O. Box 92, Forest Grove, Or., 97116, 1979, pp. 1–3.
European Patent Application 0 036 326, Regenerative Braking System for Three-Terminal D.C. Motor, date of publication 23.09.81.

Primary Examiner—Ulysses Weldon
Attorney, Agent, or Firm—Stephen L. Noe

[57] ABSTRACT

A control system (28) is provided for controlling the supply of power to a motor (12) having an armature (34) and a plugging diode (38) connected across the armature (34), including a circuit (14) for producing direction command signals, a circuit (98) for generating digital motor power command signals, a circuit (16) for sensing a plugging condition and generating a plug signal, a microprocessor (46) for generating one of a plurality of pulse trains during typical plugging conditions and for automatically overriding the generation of the one pulse train and generating other of the plurality of pulse trains during special plugging conditions. By automatically providing the override feature during the special plugging conditions, the disadvantage of manual override in prior control systems is obviated.

5 Claims, 5 Drawing Figures

FIG-2B

PLUGGING AND PLUGGING OVERRIDE CONTROL APPARATUS

DESCRIPTION

Technical Field

This invention relates generally to a power supply control apparatus and, more particularly, to a motor control apparatus for producing a type of electrical braking known as plugging and for overriding the electrical braking in response to predetermined conditions.

Electrical braking is a feature that has been utilized in motor control systems to provide controlled deceleration of a motor-driven device. Electrical braking is particularly advantageous when applied to the drive motors in an electric vehicle. For example, electrical braking can be used to slow the electric vehicle without applying the service brakes, thereby saving wear on them. Electrical braking is accomplished by energizing a motor in the direction opposite the current direction of rotation. Therefore, electrical braking occurs when a direction of travel opposite to the direction in which the vehicle is moving is selected, energizing the motor or motors for driving the vehicle in the selected direction while the vehicle continues to move in the original direction.

For example, a motor control system for producing electrical braking typically includes a power coupling element which couples power to the motor and a plugging diode connected across the motor armature. With the vehicle moving in one direction, e.g., forward, a directional control switch is changed from a forward to a reverse position, commonly known as plugging the vehicle. The motor is now energized in the reverse direction but is still rotating in the forward direction and the power coupling element is pulsed on at a predetermined rate to reduce the speed of the vehicle. Until the vehicle slows to substantially zero speed, the motor acts as a generator and a voltage is developed to forward bias the plugging diode and enable the generated current to circulate about the motor armature and plugging diode. Ultimately, the vehicle will stop and reverse its direction, at which time the motor ceases generating current, the plugging diode is no longer forward biased, and the plugging action ceases.

One problem with the above-described motor control system is that under certain conditions the plugging diode is forward biased indicating a plugging condition and resulting in the predetermined power being supplied to the motor, but full power is needed to properly control the vehicle. For example, the vehicle may be temporarily stopped on a ramp with the service brakes applied to hold the vehicle at that position. Then, the vehicle operator may place the directional control switch in the forward position and release the service brakes to drive the vehicle forward up the ramp. While the accelerator pedal then may be depressed to a full speed position, initially the vehicle may roll back, initiating the plugging condition supplying the predetermined power to the motor, and preventing the application of full speed power to the motor.

U.S. Pat. No. 3,958,163, issued May 18, 1976, to Robert C. Clark, discloses a control circuit which produces the plugging control under the typical plugging operating conditions, but overrides the plugging control under the roll-back condition. This allows the necessary power to be supplied to the motor to allow the vehicle to be driven up the ramp. However, one problem with this control circuit is that the override or anti-rollback feature must be activated manually by the vehicle operator. This is accomplished by the operator manually closing a switch to place the control circuit in the override mode. Among several disadvantages in providing a control circuit that requires manual control are that the operator may forget to close the switch and that the switch may become defective or fail, both of which would inhibit the override mode. Furthermore, this prior control circuit is not as reliable, cost-effective, and fast as a control circuit embodying digital and data processing technology.

The present invention is directed to overcoming one or more of the problems as set forth above.

DISCLOSURE OF THE INVENTION

In one aspect, the present invention includes an apparatus for electrically braking a motor. The apparatus has means for generating a plurality of different motor power command signals, means for producing a direction command signal in response to a desired direction of energization of the motor for rotation in a preselected one of a first and second direction, means for supplying a plug signal in response to rotation of the motor in one of the first and second directions and energization of the motor in the other of the first and second directions, and controllable supplying means for delivering motor power control signals to the motor. The improvement comprises means for receiving the direction signal, command signals, and plug signal, controlling the energization of the motor for rotation in the preselected direction and delivering a preselected one of the motor power control signals to the supplying means in response to reversing the controlled direction of energization of the motor and to receiving the command signals and plug signal.

A prior control apparatus requires manual control to place the circuit in the override mode and is designed around old technology. The present invention is automatic and utilizes digital and data processing technology.

BRIEF DESCRIPTION OF THE DRAWINGS

For a better understanding of the present invention, reference may be had to the accompanying drawings, in which.

BEST MODE FOR CARRYING OUT THE INVENTION

Figure 1:
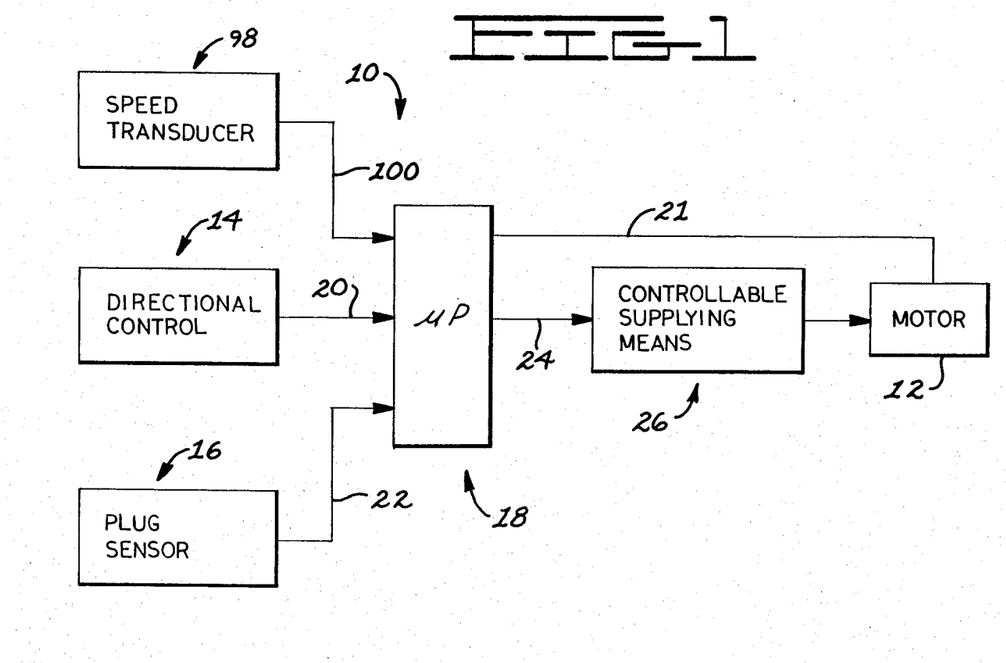
FIG. 1 is a block diagram of an embodiment of the present invention.

FIG. 1 illustrates an apparatus 10 for controlling the supply of power to a motor 12. The apparatus 10 is designed to perform the function of electrical braking and to automatically override the electrical braking under predetermined conditions.

The apparatus 10 includes means 14 for producing a direction command signal in response to a desired direction of energization of the motor 12 for rotation in a preselected one of a first and second direction. The apparatus 10 also includes means 16 for sensing plugging of the motor 12, as is further described, and supplying a plug signal in response to the plugging.

The apparatus further includes means 98 for generating a plurality of different motor power command signals each in response to a respective motor speed command and controllable supplying means 26 for delivering motor power control signals to the motor 12.

Also included in the apparatus 10 is processor means 18 for receiving the direction command signal, command signals, and plug signal, delivering a direction control signal to the motor 12 via a line 21 and delivering a preselected one of the motor power control signals to an output line 24 in response to receiving the command signals and the plug signal, and delivering respective preselected motor power control signals to the output line 24 in response to receiving the plug signal and each of the command signals in the absence of reversing the controlled direction of energization of the motor 12.

The apparatus 10 further includes a controllable supplying mean 26 receiving the signal on the line 20 and delivering motor power control signals to the motor 12 in response to the signal on the line 20.

Figures 2A, 4:
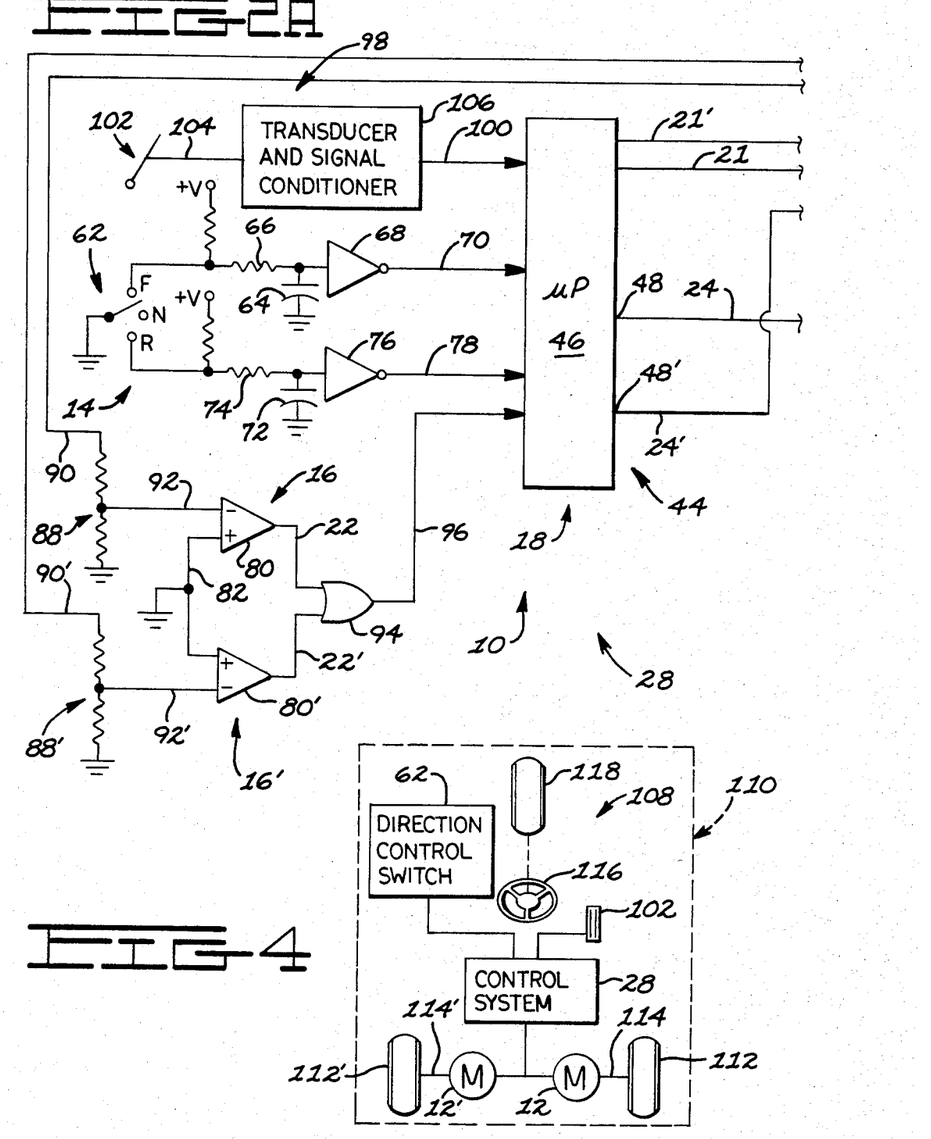
FIG. 2A and 2B is a schematic illustration of an overall motor control system having the present invention.
FIG. 4 is a schematized top view of an electric vehicle having the motor control system of the present invention.
Figure 2B:
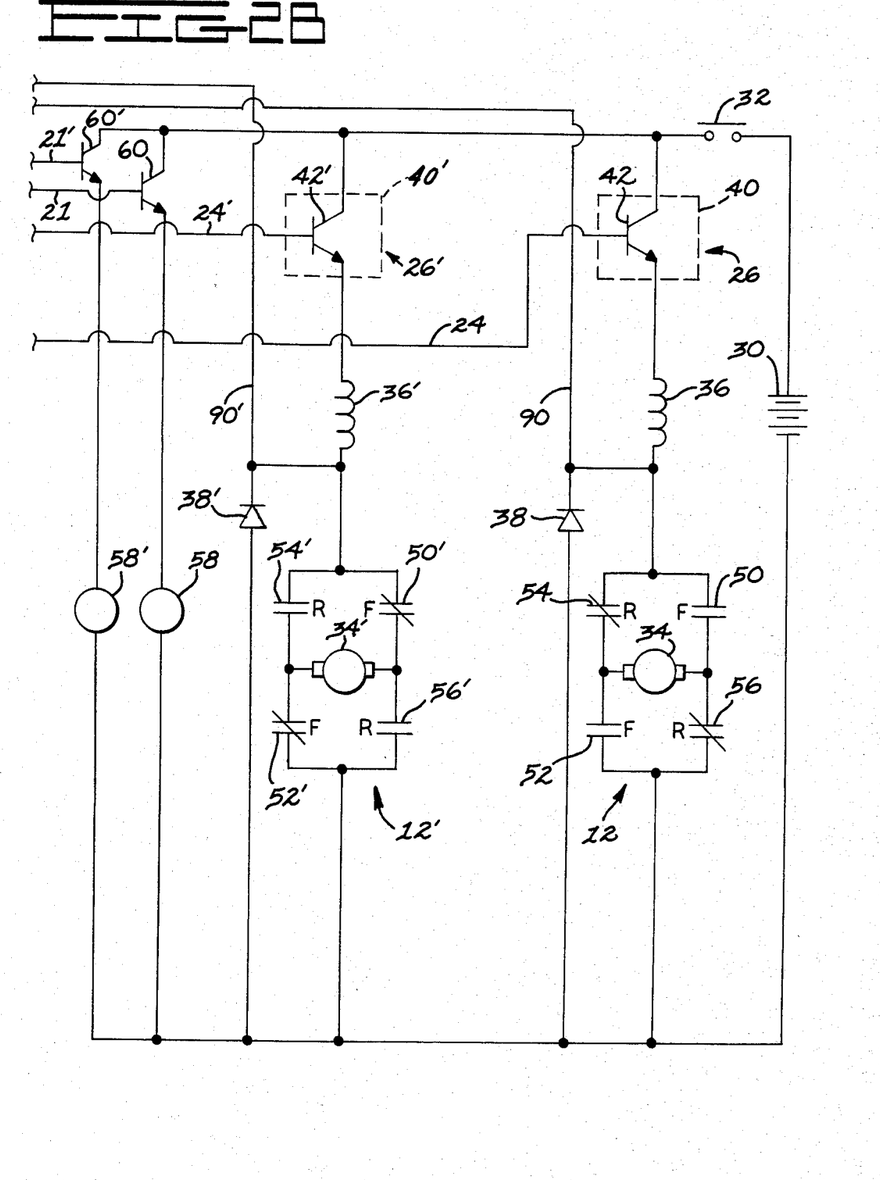

FIG. 2A and 2B shows the apparatus 10, including the direction command means 14, plug sensing means 16, processor means 18, generating means 98, and controllable supplying means 26, as part of an overall motor control system shown generally at 28. Since the principles of the present invention can be applied to simultaneously control the supply of power to a plurality of motors, as one example, a second motor 12', similar to the motor 12, is shown, as well as means 16' and means 26' similar to respectively means 16 and means 26.

The control system 28 includes a power source 30, such as a vehicle battery $V_{BAT}$ that supplies power to the motor 12 through a line contact 32. The motor 12 includes a series connected armature 34 and a field winding 36. A plugging diode 38 is connected across the armature 34, as shown, and is forward biased during a plugging condition. The controllable supplying means 26 includes a power coupling element 40 having a power transistor 42 in series connection with the motor 12, as shown.

Components similar to those just described are used in connection with the energization and control of the motor 12', and are indicated by like reference numerals, for example, an armature 34' and a power coupling element 40' having a power transistor 42'. The processor means 18 is a programmable data processor 44 such as a microprocessor 46. The microprocessor 46, under software control, delivers pulse trains to the line 24 to turn "on" and "off" the power coupling element 40. Similarly, the microprocessor 46 delivers pulse trains at an output port 48', to a line 24' to turn "on" and "off" the power coupling element 40'.

The directional means 14 includes the normally open forward contacts 50 and 52, together with the normally closed reverse contacts 54 and 56. With the line contact 32 closed, the contacts 50, 52, 54, 56 in the state shown, and the transistor 42 biased "on", current flows from the positive side of the power source 30, through the line contact 32, the transistor 42, the field winding 36, the contact 54, the armature 34, and the contact 56 to the negative side of the power source 30. With the contacts 50, 52, 54, 56 each in there other state and the transistor 42 biased on, current flows from the positive side of the power source 30, through the line contact 32, the transistor 42, the field winding 36, the contact 50, the armature 34, and the contact 52 to the negative side of the power source 30.

Plugging in this application refers to rotation of the motor 12 in one of a first and second direction and energization of the motor 12 in the other of the first and second directions. Plugging is a well known form of electrical braking of a motor in which inertial energy is dissipated in the form of heat to bring the motor to a stop.

In response to a plugging condition, the motor 12 acts as a generator, the plugging diode 38 is forward biased, and the generated current circulates from one side of the armature 34 through, for example, the closed contact 56, the plugging diode 38, and the closed contact 54 to the other side of the armature 34. The generated current circulates in the other direction through the armature 34 in response to the contacts 50, 52 being closed and contacts 54, 56 being open.

The means 14 also includes a directional contactor coil 58 and a switch 60, such as a transistor, which, when closed or turned "on", causes the energization of the coil 58 from the power source 30. The coil 58 controls the state of the contacts 50, 52, 54, 56 in a conventional manner. Another directional contactor coil 58' and switch 60' controls the state of the contacts 50', 52', 54', 56' in a like manner. The switch 60 is closed in response to a directional control signal on the line 21 and the switch 60' is closed in response to a directional control signal on a line 21'. Note that the forward contacts 50', 52' are normally closed and that the reverse contacts 54', 56' are normally open, which is the opposite of the normal state of contacts 50, 52, 54, 56.

The means 14 further includes a directional control switch 62 having a forward position F, neutral position N and reverse position R. With the switch 62 in the neutral position N, a capacitor 64 is charged through a resistor 66 to a logic 1 from +V and the output of an inverter 68 on a line 70 is a logic 0, and a capacitor 72 is charged through a resistor 74 to a logic 1 from +V and the output of an inverter 76 on a line 78 is a logic 0.

In response to the directional control switch 62 being moved to the forward position F, the capacitor 64 is discharged through the resistor 66 and the switch 62 to a logic 0 and the output on the line 70 is a logic 1 representing the forward direction. In response to the directional control switch 62 being moved to the reverse position R, the capacitor 72 is discharged through the resistor 74 and the switch 62 to a logic 0 and the output on the line 78 from the inverter 76 is a logic 1 representing the reverse direction.

Under software control, the microprocessor 46 responds to the logic 1 on the line 70 by closing or turning on the switch 60 with the output directional control signal on the line 21, energizing the coil 58 and changing the state of the contacts 50, 52, 54, 56. Therefore, the forward contacts 50, 52 are closed, the reverse contacts 54, 56 are opened and the forward contacts 50', 52' remain closed. Consequently, the motor 12 and the motor 12' can be energized in the same, i.e., forward direction. Likewise, under software control, the microprocessor 46 responds to the logic 1 on the line 78 by closing or turning on the switch 60' with the output directional control signal on the line 21', energizing the coil 58' and changing the state of the contacts 50', 52', 54', 56'. Therefore, the reverse contacts 54', 56' are closed, the forward contacts 50', 52' are opened and the reverse contacts 54, 56 remain closed, so that the motor 12 and the motor 12' can be energized in the same, i.e., reverse direction.

The means 16 for supplying a plug signal in response to rotation of the motor in one of the first and second directions and energization of the motor in the other of the first and second directions includes an operational amplifier 80. The amplifier 80 has an input (+) that receives a fixed reference voltage signal via an input line 82 connected to a common or logic ground. A voltage divider 88 has an input line 90 connected to one side of the plugging diode 38, and an output line 92 connected to an input (−) of the amplifier 80. During a plugging condition the plugging diode 38 is forward biased and the voltage divider 88 develops a voltage signal on the line 92 that is less than the reference voltage signal on the line 82. In response, the amplifier 80 switches states and produces a logic 1 signal on the line 22 indicating the occurrence or presence of the plugging condition. In the absence of the plugging condition, the plugging diode 38 is reverse biased and the voltage signal on the line 92 is greater than the voltage signal on the line 82. In response, the amplifier 80 switches states and produces a logic 0 signal on the line 22 indicating the absence of the plugging condition.

The means 16' includes components similar to the components of the means 16 which sense the bias condition of the plugging diode 38' and generate the logic signals indicating the presence or absence of the plugging condition. Thus, the means 16' includes, for example, an amplifier 80', voltage divider 88' and output line 22'. Also shown is an OR gate 94 which gates either the logic 1 signal on the line 22 or the logic 1 signal on the line 22' to a line 96 which is connected to the microprocessor 46. In the absence of a logic 1 signal on at least one of the lines 22, 22', the gate 94 delivers a logic 0 signal to the line 96.

The motor control system 28 also includes a means 98 for generating a plurality of different motor power command signals, each in response to a respective motor speed command, on an output line 100. For example, the data produced by the generating means 98 on the line 100 can be 4-bit digital numbers ranging from 0000 to 1111. Each digital number in the range 0000–1111 represents a different motor speed command for the motor 12 and the motor 12'. For example, number 0000 represents zero speed, number 1000 represents half speed and number 1111 represents full or maximum speed. Under software control, the microprocessor 46 responds to the digital numbers on the line 100 by delivering respective preselected motor power control signals via the line 24 and the line 24', to the supplying means 22, 22'.

Thus, in the present example, since there are sixteen digital numbers or power command signals in the range 0000–1111, there are sixteen different power control signals, for example pulse trains, that can be produced on the line 24 and the line 24' to rotate the motor 12 and the motor 12' at sixteen different speeds. The sixteen pulse trains that can be produced by the microprocessor 46 can each be different in duty factor or proportion of pulse on-time to pulse off-time.

The range of digital numbers from 0000 to 1111 in the binary coded decimal format (BCD) is used only for convenient illustration and can, of course, be other suitably coded binary representations having a number of bits consistent with the desired precision, for example, a gray code.

In one example, the generating means 98 can be coupled to an accelerator pedal 102 via a linkage 104. The generating means 98 includes a transducer and signal conditioning circuit 106 for converting position information, i.e., motor speed command information, of the accelerator pedal 102 to any one of the digital numbers 0000–1111 on the line 100.

There are three discrete modes of operation of the apparatus 10: a normal operating mode, a plugging mode, and a plugging override mode. In the normal mode, the microprocessor 46 delivers each of the sixteen pulse trains to the line 24 and the line 24' in response to the respective motor power command signals on the line 100. In the plugging mode, the microprocessor 46 delivers a predetermined pulse train onto the line 24 and the line 24' in response to the motor power command signals on the line 100. The predetermined pulse train is, for example, the one of the sixteen pulse trains corresponding to minimum speed greater than zero. In the plugging override mode, even though a plugging condition exists, the microprocessor 46 will again function as described above in the normal mode.

Figure 3:
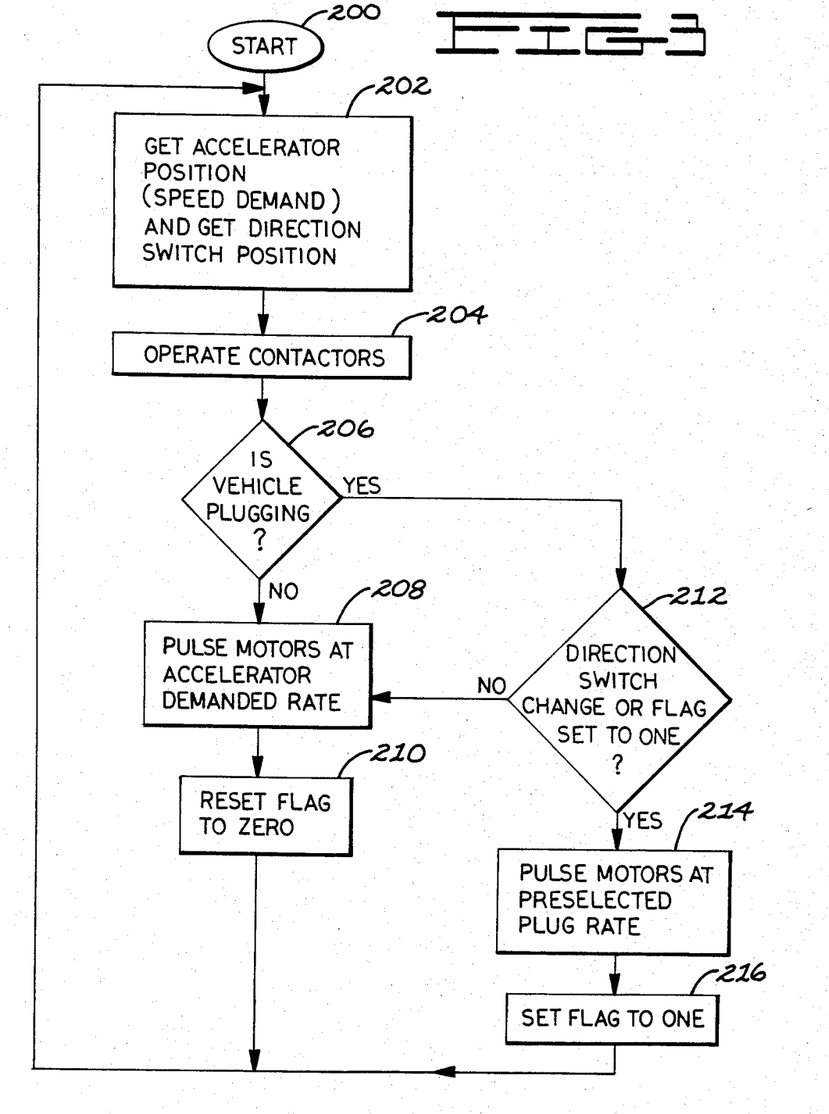
FIG. 3 is a flowchart used to explain the software of the present invention.

FIG. 3 is a flowchart of a computer program suitable for controlling the apparatus 10. Only the software routines required to implement one embodiment of the present invention are described herein. Sufficient detail is presented to allow one skilled in computer programming to write the required program to implement the flowchart for any common microprocessor. The program of FIG. 3 was designed to be run on a microprocessor produced by MOSTEK Corporation of Carrollton, Tex., and designated by the part number 3870.

Upon beginning the flowchart of FIG. 3 at the block 200 labeled START, program control progresses through the following sequence:

In the block 202 the microprocessor 46, receives the information relating to the accelerator pedal 102 position or speed demand that is supplied on the line 100 and the information relating to the direction switch 62 position that is supplied on the line 70, 78. The microprocessor 46 then delivers, in the block 204, appropriate control signals to the switches 60, 60' to drive the direction contact coils 58, 58' for vehicle 110 operation in the direction required by the direction switch 62. The current direction of travel is stored in a variable by the microprocessor 46.

In the block 206, the microprocessor 46 next checks the status of the line 96 to determine if the plugging diodes 38, 38' are indicating that a plugging condition exists. If the vehicle 110 is not plugging, control passes to the block 208 where the microprocessor 46 determines, either by calculation or from a look-up table stored in memory, appropriate pulse train waveforms to output at the ports 48, 48' to operate the vehicle 110 at the speed demanded by the accelerator pedal 102 position. Additionally, in the block 210, a software register used as a flag, for purposes to be described later, is reset to zero. Control is then transferred back to the block 202 and the process begins anew.

If, in the block 206, the vehicle 110 is found to have entered the plugging mode, control proceeds to the block 212 rather than to the block 208. In the block 212 the microprocessor 46 compares the stored direction of travel, discussed in the block 202, with the direction demanded by the direction switch 62 position as indicated by the signals received on the lines 70, 78, and checks the status of the flag register. If the direction switch 62 has not changed from the stored direction of travel and the flag register equals zero (reset) the received plugging indication must be due to a roll-back condition and plugging control is overridden by proceeding directly to the block 208 as described above. If the direction switch 62 has changed from the stored direction of travel or the flag register equals one (set) the vehicle 110 is in a normal plugging mode and control passes to the block 214. In the block 214 the microprocessor 46 outputs the preselected pulse train waveform at the ports 48, 48' to pulse the motors 12, 12' for plugging. Next, in the block 216, the flag register is set to one and control returns to the block 202 for the next program iteration.

The use of the flag register insures that the motors 12, 12' will be pulsed at the preselected plug rates only when the vehicle 110 is actually in the plug mode and that normal vehicle 110 response to the accelerator pedal 102 position will occur under both non-plugging conditions and during vehicle roll-back.

FIG. 4 shows an overall vehicle control system 108 for an electric vehicle 110, such as an electric fork lift truck, having a left drive wheel 112 and a right drive wheel 112'. The motor 12 rotates the drive wheel 112 through a shaft 114 and the motor 12' rotates the drive wheel 112' through a shaft 114'. The control system 28 controls the energization and deenergization of the motor 12 and the motor 12' in the manner previously described and in response to the directional control switch 62 and the accelerator pedal 102. Also shown is a steering wheel 116 and a steerable wheel 118 that is controlled by the steering wheel 148.

INDUSTRIAL APPLICABILITY

Normal Mode of Operation

In the overall normal operation of the vehicle control system 28 and the vehicle 110, assume, for example, that the directional control switch 62 is in the forward position F, that the accelerator pedal 102 is at a full speed position and that the vehicle 110 is moving in the forward direction. This constitutes a normal, non-plugging operating condition since the vehicle 110 is moving in the direction called for by the directional control switch 62.

The microprocessor 46 receives the logic 1 direction signal on the line 70, the digital number command signal 1111 on the line 100 and the logic 0 plug signal on the line 96. In response, the microprocessor 46 outputs the directional control signal on the line 21 to close the switch 60 and energize the coil 58, thus controlling the energization of the motors 12, 12' for rotation in the preselected direction. The microprocessor 46 also outputs the maximum speed pulse train on the line 24 and the line 24'. In response, the power coupling element 40 and the power coupling element 40' are biased "on" and "off" to deliver full power to the motor 12 and the motor 12'. Responsively, the vehicle 110 moves forward at maximum speed.

During this forward movement, the accelerator pedal 102 can be released or depressed to any position, resulting in the means 98 generating the corresponding command signals on the line 100. The microprocessor 46 responds to the command signals by delivering the corresponding pulse train on the line 24 and the line 24' to drive the motor 12 and the motor 12', and hence the vehicle 110, at the corresponding speeds.

Similarly, assume now that the directional control switch 62 is in the reverse position R, that the accelerator pedal 102 is in the half speed position and that the vehicle 110 is moving in the reverse direction. The microprocessor 46 receives the logic 1 signal on the line 78, the digital number 1000 on the line 100 and the logic 0 signal on the line 96. In response, the microprocessor 46 outputs the directional control signal on the line 21' to close the switch 60' (switch 60 now is open) and the corresponding half-speed pulse train on the line 24 and the line 24'. Therefore, the vehicle 110 is driven in reverse at half speed. As the position of the accelerator pedal 102 is changed and different command power signals are generated on the line 100, the microprocessor 46 responds by outputting the corresponding pulse trains on the line 24 and the line 24' to drive the vehicle 110 in reverse at the commanded speeds.

Therefore, in the normal mode the microprocessor 46 receives the direction signal, the command signals, and the plug signal, controls the energization of the motors 12, 12' for rotation in the preselected direction in response to receiving the direction signal, and delivers respective preselected motor power control signals to the supplying means 26, 26' in response to receiving each of the command signals.

Plugging Mode of Operation

In the plugging mode of operation, assume that the directional control switch 62 is in the forward position F, that the accelerator pedal 102 is at a full speed position and that the vehicle 110 is moving in the forward direction at full speed. Assume now that the directional control switch 62 is moved to the reverse position R. The microprocessor 46 responds to this change in direction by closing the switch 60' and opening the switch 60. Now, the motor 12 and the motor 12' are being energized in the reverse direction, but since the vehicle 110 is still moving in the forward direction due to inertia, the motor 12 and the motor 12' continue to rotate in the forward direction and act as generators.

Consequently, the plugging diode 38 and the plugging diode 38' are forward biased resulting in the presence of the plug signal, i.e., logic 1 signal, on the line 96. The microprocessor 46 responds to the change in direction of energization of the motor 12 and the motor 12' and the presence of the logic 1 plug signal by generating a predetermined one of the pulse trains on the line 24 and the line 24'. For example, this one pulse train can be the pulse train corresponding to minimum speed greater than zero. Therefore, the motor 12 and the motor 12' are energized to slowly reduce the speed of the vehicle 110.

Ultimately, the vehicle 110 speed is reduced to zero and the vehicle 110 commences moving in the reverse direction, which is the same direction being called for by the directional control switch 62. Now, the motor 12 and the motor 12' stop acting as generators, the plugging diode 38 and the plugging diode 38' are reverse biased, and the logic 1 plug signal is no longer on the line 96 indicating the plugging condition has ceased. Now, the normal mode of operation again exists, so that the microprocessor 46 responds by outputting each of the pulse trains on the line 24 and the line 24' being commanded by the motor power control signals received on the line 100.

A similar sequence of operation occurs in response to the directional control switch 62 being in the reverse position R with the vehicle 110 moving in the reverse direction and then being moved to the forward position F. Until the vehicle 110 speed is reduced to zero the plugging condition exists and the microprocessor 46 outputs the predetermined one of the pulse trains. When the vehicle 110 begins moving in the forward direction, the microprocessor 46 again responds as in the normal mode described above.

Therefore, in the plugging mode the microprocessor 46 receives the direction signal, the command signals, and the plug signal, controls the energization of the motors 12, 12' for rotation in the preselected direction in response to receiving the direction signal, and delivers a preselected one of the motor power control signals to the supplying means 26, 26' in response to reversing the controlled direction of energization of the motors 12, 12' and to receiving the command signals and the plug signal.

Plugging Override Mode of Operation

In the plugging override mode of operation, assume that the vehicle 110 stops on a ramp using the service brakes (not shown), with its front end facing up the ramp and the directional control switch 62 in the forward position F. Assume now that the service brakes are released, allowing the vehicle 110 to begin rolling back. At this time, the vehicle 110 is moving in the direction opposite that being called for by the switch 62, and the motor 12 and the motor 12' act as generators. In response, the plugging diodes 38, 38' are forward biased resulting in the logic 1 plug signal being delivered on the line 96, indicating a plugging condition.

Then, assume that as the vehicle 110 rolls back the accelerator pedal 102 is depressed to a full speed position. In the absence of the override feature, the microprocessor 46 responds as described above in the plugging mode by delivering the preselected pulse train greater than zero on the line 24 and the line 24', preventing the vehicle 110 operator from overcoming the roll back by changing the accelerator pedal 102 position. With the override feature, the microprocessor 46 responds to the absence of a change in the direction of energization of the motor 12 and the motor 12' and the presence of the logic 1 plug signal by automatically overriding the generation of the selected one pulse train and generating any of the plurality of pulse trains on the line 24 and the line 24' commanded by the signal on the line 100. Thus, in this example, the microprocessor 46 outputs the pulse train corresponding to full speed for driving the vehicle 110 forwardly up the ramp and preventing continued roll-back.

Similarly, assume that vehicle 110 is stopped on the ramp using the service brakes, with the front end facing down the ramp and the directional control switch 62 in the reverse position R. When the service brakes are released, the vehicle 110 tends to roll forward down the ramp, moving in a direction opposite to that called for by the switch 62. The motor 12 and the motor 12' act as generators and the plugging diodes 38, 38' are forward biased.

The microprocessor 46 responds to the absence of a change in the direction of energization of the motor 12 and the motor 12' and the presence of the logic 1 plug signal on the line 96 by automatically overriding the generation of the preselected one pulse train and generating any of the plurality of pulse trains in response to the command signal on the line 100. In response, the vehicle 110 moves in reverse up the ramp at the commanded speed.

Therefore, in the plugging override mode the microprocessor 46 receives the direction signal, the command signals, and the plug signal, controls the energization of the motors 12, 12' for rotation in the preselected direction in response to receiving the direction signal, and delivers respective preselected motor power control signals to the supplying means 26, 26' in response to receiving the plug signal and each of the command signals in the absence of reversing the controlled direction of energization of the motors 12, 12'.

In summary, the present invention can automatically override a plugging condition under certain conditions, such as when the vehicle 110 is on a ramp, as discussed previously. Also, by using digital and data processing technology such as the programmed microprocessor 46, and digital signal processing, the present invention is cost-effective and highly responsive.

Other aspects, objects and advantages of the invention can be obtained from a study of the drawings, the disclosure, and the appended claims.

We claim:

1. Apparatus (10) for controllably energizing a motor (12) of a vehicle, said vehicle having a power source (30) and said motor (12) having an armature winding (34) and a field winding (36), comprising:

an accelerator pedal (102) moveable to a plurality of motor speed command positions;

generating means (98) for producing a predetermined plurality of incremental coded digital motor power command signals in response to the position of said accelerator pedal (102);

direction sensing means (14) for producing forward and reverse digital logic direction signals in response to a selected direction of vehicle travel; , a plugging diode (38) connected in parallel with said armature winding (34) of said motor (12) and being forward biased in response to plugging of said motor (12) and reverse biased in the absence of plugging of said motor (12);

plug sensing means (16) for producing a digital logic plug signal in response to said plugging diode (38) being forward biased, wherein said plug sensing means (16) includes a voltage divider (88) serially connected between said plugging diode (38) and circuit common, an amplifier (80) having a first input connected to said voltage divider, a second input connected to circuit common, and an amplifier output, and a logic gate (94) having an input connected to said amplifier output and an output adapted to deliver the said digital logic plug signal;

a plurality of directional contacts (50,52,54,56) connected between said armature winding (34) and said power source (30) and adapted to selectively control the direction of current flow through said armature winding (34);

a power coupling element (40) serially connected between said motor (12) and said power source (30); and, programmed microprocessor means (18) for:

(1) receiving said predetermined plurality of incremental coded digital motor power command signals, said forward and reverse digital logic direction signals, and said digital logic plug signal;

(2) controllably actuating said direction contacts (50,52,54,56) in response to receiving one of said forward and reverse digital logic direction signals;

(3) periodically storing the digital value of said forward and reverse digital logic direction signal currently being received;

(4) producing and delivering respective predetermined motor power control signals to said power coupling element (40) in response to receiving said coded digital motor power command signals and said forward and reverse digital logic direction signals and to being free from receiving said digital logic plug signal;

(5) continuing to produce and deliver respective predetermined motor power control signals to said power coupling element (40) in response to receiving said digital logic plug signal and said coded digital motor power command signals and to continuing to receive the one of said forward and reverse digital logic direction signals last stored prior to receiving said digital logic plug signals; and, (6) producing and delivering only a predetermined one of said motor power control signals to said power coupling element (40) in response to receiving said digital logic plug signal, any of said plurality of coded digital motor power command signals, and the other of said forward and reverse digital logic direction signals different from the one of said digital logic direction signals last stored prior to receiving said digital logic plug signal.

2. Apparatus (10), as set forth in claim 1, wherein said direction sensing means (14) includes a manual direction control switch (62) having a forward and reverse contact position, and a pair of logic inverter gates (68, 70) each having an input connected to a respective one of said forward and reverse contact positions and an output connected to said microprocessor means (18).

3. Apparatus (10), as set forth in claim 1, including a second motor (12') having a second armature winding (34') and field winding (36'), and a second plugging diode (38') connected in parallel with said second armature winding (36') and being forward biased in response to plugging of said second motor (12') and reverse biased in the absence of plugging of said second motor (12'), and wherein said plug sensing means (16) produces said digital logic plug signal in response to at least one of said plugging diodes (38,38') being forward biased.

4. Apparatus (10), as set forth in claim 3, wherein said plug sensing means (16) includes a second voltage divider (88') serially connected between said second plugging diode (38') and circuit common, and a second amplifier (80') having a first input connected to said second voltage divider (88'), a second input connected to circuit common, and an output, said logic gate (94) having a second input connected to said second amplifier output.

5. Apparatus (10) for controllably energizing first and second motors (12, 12') of a vehicle, said vehicle having a power source (30) and said first and second motors (12, 12') having respective armature winings (34, 34') and field windings (36, 36'), comprising:

an accelerator pedal (102), moveable to a plurality of motor speed command positions;

generating means (98) for producing a predetermined plurality of incremental coded digital motor power command signals in response to the position of said accelerator pedal (102);

direction sensing means (14) for producing forward and reverse digital logic direction signals in response to a selected direction of vehicle travel;

a first plugging diode (38) connected in parallel with said armature winding (34) of said first motor (12) and being forward biased in response to plugging of said first motor (12) and reverse biased in the absence of plugging of said first motor (12);

a second plugging diode (38') connected in parallel with said armature winding (36') of said second motor (12') and being forward biased in response to plugging of said second motor (12') and reverse biased in the absence of plugging of said second motor (12');

plug sensing means (16) for producing a digital logic plug signal in response to at least one of said plugging diodes (38, 38') being forward biased;

a plurality of directional contacts (50, 52, 54, 56) connected between said armature winding (34) and said power source (30) and adapted to selectively control the direction of current flow through said armature winding (34);

a power coupling element (40) serially connected between said motor (12) and said power source (30); and, programmable microprocessor means (18) for:

(1) receiving said predetermined plurality of incremental coded digital motor power command signals, said forward and reverse digital logic direction signals, and said digital logic plug signal;

(2) controllably actuating said direction contacts (50, 52, 54, 56) in forward and reverse digital logic direction signals;

(3) periodically storing the digital value of said forward and reverse digital logic direction signal currently being received;

(4) producing and delivering respective predetermined motor power control signals to said power coupling element (40) in response to receiving said coded digital motor power command signal and said forward and reverse digital logic direction signals and to being free from receiving said digital logic plug signal;

(5) continuing to produce and deliver respective predetermined motor power control signals to said power coupling element (40) in response to receiving said digital logic plug signal and said coded digital motor power command signals and to continuing to receive the one of said forward and reverse digital logic direction signals last stored prior to receiving said digital logic plug signal; and, (6) producing and delivering only a predetermined one of said motor power control signals to said power coupling element (40) in response to receiving said digital logic plug signal, any of said plurality of coded digital motor power command signals, and the other of said forward and reverse digital logic direction signals different from the one of said digital logic direction signals last stored prior to receiving said digital logic plug signal; and, wherein said plug sensing means (16) includes a first voltage divider (88) serially connected between said first plugging diode (38) and circuit common, a first amplifier (80) having a first input connected to said first voltage divider, a second input connected to circuit common, and an output, and a logic gate (94) having a first input connected to said first amplifier output and an output connected to said microprocessor means (18); and a second voltage divider (88') serially connected between said second plugging diode (38') and circuit common, a second amplifier (80') having a first input connected to said second voltage divider (88'), a second input connected to circuit common, and an output, said logic gate (94) having a second input connected to said second amplifier output.

* * * * *